United States Patent Office 3,594,359
Patented July 20, 1971

3,594,359
METHOD OF POLYMERIZING VINYL CHLORIDE
Anatoly Mikhailovich Sharetsky, Ulitsa Pirogova 14, kv. 15; Stanislav Vladimirovich Svetozarsky, Prospekt Pobedy 8-a, kv. 15; Ekhiel Naumovich Zilberman, Prospekt Dzerzhinskogo 10, kv. 3; and Isaak Elya-Berkovich Kotlyar, Ulitsa Kljukvina 11-a, kv. 42, all of Dzerzhinsk, U.S.S.R.
No Drawing. Filed Sept. 3, 1968, Ser. No. 757,123
Int. Cl. C08f 1/11, 3/30, 11/62
U.S. Cl. 260—92.8
4 Claims

ABSTRACT OF THE DISCLOSURE

Vinyl chloride is polymerized in an aqueous medium at 0° to 25° C. using a novel redox system consisting of lauroyl peroxide and ferrous hydroxide, using sodium styrene-maleate, polyvinyl alcohol or methyl cellulose as the dispersing agent, chloroform or trichloroethylene as the molecular weight regulator and triethylamine as the polymerization inhibitor.

---

The present invention relates to methods of polymerizing vinyl chloride. The resultant polyvinyl chloride is usually employed in the manufacture of non-shrinking fibers, films, and other thermostable products.

There are known in the art several methods of polymerizing vinyl chloride. Among these the most effective method consists in the polymerization of vinyl chloride in water-alcohol medium in the presence of a dispersing agent such as methyl cellulose, a molecular weight regulator, a polymerization inhibitor—styrene and oxalic acid, and a redox system consisting of lauroyl peroxide and the caproate of bivalent iron. The polymerization process is carried out at a temperature of −15° C.

The disadvantage of this method is that the polymerization is carried out at temperatures below 0° C. and thus requires the use of a refrigeration unit and a non-freezing dispersion medium containing not less than 25% methanol. This makes the final product costly.

The other known methods for the polymerization of vinyl chloride consist in a process in which chloroform or trichloroethylene are used as the molecular weight regulator, triethyl amine as the polymerization inhibitor, and either methyl cellulose, polyvinyl alcohol, or sodium styrene-maleate as the dispersing agent. However, the thermal stability of the resultant polymer is not sufficiently high; for example, the second-order-transition temperature is about 75–80° C. In order to improve the thermostability it is necessary to carry out the polymerization at temperatures below 0° C. and thus to use refrigeration units, alcohols, and other antifreeze agents.

It is an object of the present invention to provide a method of polymerizing vinyl chloride that would make it possible to carry out the process at temperatures above 0° C. and thus avoid the use of expensive refrigeration equipment and alcohols as the non-freezing medium.

These and other objects have been accomplished by carrying out the polymerization of vinyl chloride in the presence of sodium styrene-maleate, polyvinyl alcohol, or methyl cellulose as the dispersing agent, chloroform or trichloroethylene as the molecular weight regulator, triethylamine as the polymerization inhibitor, and a redox system consisting of lauroyl peroxide and a bivalent iron compound.

According to the invention ferrous hydroxide is used as the bivalent iron compound which is a component of the redox system. The polymerization of vinyl chloride is carried out at a temperature of from 0° C. to 25° C. in an aqueous medium with the weight ratio of vinyl chloride to water being from 1:1.5 to 1:2.5.

It is advisable to take lauroyl peroxide, the oxidizer, in the amount of 0.1–0.5% by weight based on the weight of the starting vinyl chloride and to take ferrous hydroxide, the reducing agent, in the amount of 0.05–0.15% by weight based on the weight of the starting vinyl chloride.

Ferrous hydroxide can be produced directly in the reaction medium during the polymerization process. For this purpose a water-soluble salt of bivalent iron and alkaline metal hydroxide such as ferrous sulfate or sodium hydroxide are used. This procedure is convenient to carry out under industrial conditions since ferrous hydroxide is an unstable compound and cannot be stored for a long period of time. In practice the present method is carried out as follows.

Into an autoclave from which oxygen has been removed by purging with an inert gas such as nitrogen, is charged in an aqueous solution the above-mentioned dispersing agent such as sodium styrene-maleate and ferrous sulfate, following which the autoclave is again purged with nitrogen and then into it are charged vinyl chloride, lauroyl peroxide dissolved in a molecular weight regulator such as trichloroethylene, and a sodium hydroxide solution. The polymerization is carried out at a temperature of from 0° C. to 25° C. and under constant stirring.

The polymerization is stopped by adding triethyl amine, the polymerization inhibitor. The above-mentioned dispersing agent is taken in an amount of 0.02–0.1% by weight based on the weight of water charged; the molecular weight regulator is taken in an amount of 4–6% by weight based on the starting vinyl chloride, and the inhibitor is taken in an amount of 0.1–0.3% by weight based on the starting vinyl chloride. Ferrous sulfate and sodium hydroxide are taken in such an amount that the concentration of the ferrous hydroxide produced would be 0.05–0.15% by weight based on the starting vinyl chloride.

The present method makes it possible to exclude the use of a non-freezing medium such as water-methanol, to avoid the use of a refrigeration unit, and thus to reduce the cost of the final product.

Furthermore, the exclusion of methanol from the polymerization ingredients is conductive to the production of the polymer having the form of homogeneous granules. The medium thereby acquires a low viscosity, and an efficient removal of the heat of reaction and a high yield of the polymer are provided. Efficient heat removal and the exclusion of the possibility of overheating inside the polymer grains are also due to the fact that the polymerization of vinyl chloride is carried out in an aqueous medium and that ferrous hydroxide, the reducing agent, is insoluble both in water and in the monomer, and therefore the polymerization takes place at the interphase boundary, i.e., on the surface of the monomer droplets.

The following examples are given by way of illustration and are not to be regarded as limitations of the invention.

EXAMPLE 1

Into an autoclave having a capacity of 4 l. and freed of oxygen by purging with pure nitrogen are charged 200 parts by weight of a 0.03% aqueous solution of sodium styrene-maleate and 0.15 part by weight of ferrous sulfate. After the autoclave has undergone evacuation three times (by reducing the pressure inside the autoclave to 5–10 mm. Hg) and purged with nitrogen, into it are charged 100 parts by weight of lauroyl peroxide dissolved in 40 parts by weight of trichloroethylene, and 1.7 parts by weight of a 0.5% aqueous solution of sodium hydroxide.

The polymerization is carried out at 20° C. and under constant stirring. After a 5-hour reaction period the yield of the polymer is 80% (based on the starting vinyl chloride).

The reaction is stopped by adding to the reactants 0.2 part by weight of triethyl amine. Intrinsic viscosity of the obtained polymer is 1.48. The second-order-transition temperature of polyvinyl chloride is 92° C. (determined by the dynamometric method).

EXAMPLE 2

Into an autoclave having a capacity of 195 l. and freed of oxygen by purging with pure nitrogen are charged a 0.03% aqueous solution of polyvinyl alcohol and 115 g. of ferrous sulfate. After the autoclave has undergone evacuation (by reducing the pressure inside the autoclave to 5–10 mm. Hg), into it are charged 40 kg. of vinyl chloride, 180 g. of lauroyl peroxide dissolved in 1,800 g. of trichloroethylene, and 650 g. of a 0.5% aqueous solution of sodium hydroxide.

The polymerization is carried out at 10° C. and under constant stirring. After a 15-hour reaction period the yield of the polymer is 65%.

The reaction is stopped by adding to the reactants 80 g. of triethyl amine. Instrinsic viscosity of the obtained polymer is 1.4.

The second-order-transition temperature of polyvinyl chloride is 96° C. (determined by the dynamometric method).

What we claim is:

1. A method of polymerizing vinyl chloride which comprises polymerizing vinyl chloride in an aqueous medium with the vinyl chloride to water weight ratio being from 1:1.5 to 1:2.5 and at a temperature of from 0° C. to 25° C. in the presence of a dispersing agent selected from the group consisting of sodium styrene-maleate, polyvinyl alcohol, and methyl cellulose; a molecular weight regulator selected from the group consisting of chloroform and trichloroethylene, triethyl amine as the polymerization inhibitor; and a redox system consisting of lauroyl peroxide and ferrous hydroxide where the ferrous hydroxide is insoluble both in the water and in the monomer and the polymerization takes place at the interphase boundary on the surface of the monomer droplets.

2. A method, according to claim 1, wherein the amount of the lauroyl peroxide, the oxidizer, which is a component of the redox system, is 0.1–0.5% by weight based on the starting vinyl chloride and the amount of the ferrous hydroxide, the reducing agent, is 0.05–0.15% by weight based on the starting vinyl chloride.

3. A method, according to claim 1, wherein ferrous hydroxide, the reducing agent, which is a component of the redox system, is obtained by the reaction of a water-soluble salt of bivalent iron with alkaline metal hydroxide directly in the reaction medium.

4. A method, according to claim 3, wherein ferrous hydroxide is obtained by the reaction of ferrous sulfate with sodium hydroxide.

References Cited

UNITED STATES PATENTS 2,842,528    7/1958    Herbst et al. _____ 260—92.8

FOREIGN PATENTS 895,153    5/1962    Great Britain _____ 260—92.8

OTHER REFERENCES

Akio Konishi and Keitchi Nambu, Suspension Polymerization of Vinyl Chloride at Low Temperature with the Use of Monomer-Soluble Redox Initiators, Journal of Polymer Science, vol. 54 (1961), pp. 209–219.

JOSEPH L. SCHOFER, Primary Examiner

J. A. DONAHUE, Jr., Assistant Examiner

U.S. Cl. X.R.

260—87.5